United States Patent
Jolly et al.

(10) Patent No.: US 11,076,043 B2
(45) Date of Patent: Jul. 27, 2021

(54) SYSTEMS AND METHODS OF VOICEPRINT GENERATION AND USE IN ENFORCING COMPLIANCE POLICIES

(71) Applicant: Red Box Recorders Limited, Nottinghamshire (GB)

(72) Inventors: Simon Jolly, Nottingham (GB); Tony Commander, Manchester (GB); Kyrylo Zotkin, Kyiv (UA); Liam Gulliver, Loughborough (GB)

(73) Assignee: RED BOX RECORDERS LIMITED, Nottinghamshire (GB)

( * ) Notice: Subject to any disclaimer, the term of this patent is extended or adjusted under 35 U.S.C. 154(b) by 0 days.

(21) Appl. No.: 16/593,437

(22) Filed: Oct. 4, 2019

(65) Prior Publication Data
US 2021/0105358 A1 Apr. 8, 2021

(51) Int. Cl.
*H04M 1/64* (2006.01)
*H04M 3/42* (2006.01)
(Continued)

(52) U.S. Cl.
CPC ......... *H04M 3/42221* (2013.01); *G10L 17/00* (2013.01); *G10L 17/04* (2013.01); *G10L 17/06* (2013.01); *G10L 25/60* (2013.01); *H04M 2201/41* (2013.01); *H04M 2203/301* (2013.01); *H04M 2203/558* (2013.01); *H04M 2203/609* (2013.01); *H04M 2203/6054* (2013.01); *H04M 2203/6081* (2013.01)

(58) Field of Classification Search
CPC .. H04M 3/42221; G10L 17/005; G10L 17/04; G10L 17/06; G10L 25/60
See application file for complete search history.

(56) References Cited

U.S. PATENT DOCUMENTS 6,356,868 B1  3/2002 Yuschik et al.
7,454,349 B2 11/2008 Teunen et al.
(Continued)

FOREIGN PATENT DOCUMENTS

EP   2577655 B1   11/2016

OTHER PUBLICATIONS

Sciences Engineering Medicine; The National Academies Press; Voice Communication Between Humans and Machines (1994); 560 pages I 6×9 I Hardback ISBN 978-0-309-04988-7 I DOI 10.17226/2308; David B. Roe and Jay G. Wilpon, Editors; for the National Academy of Sciences; This PDF is available at http://nap.edu/2308.

*Primary Examiner* — Simon King
(74) *Attorney, Agent, or Firm* — Katten Muchin Rosenman LLP

(57) ABSTRACT

A system, method and non-transitory computer readable medium for generating a voiceprint for a call participant are disclosed, wherein an audio recording or communication session is received, the quality of the audio recording is analyzed, and if determined to be of sufficient quality, the audio recording is separated into speech for each call participant, which may be further analyzed to generate a voiceprint for each participant. The voiceprint that is generated may be used to identify the participant in other historical recordings or in an active communications session, and upon such an identification, one or more compliance or data protection policies may be applied.

18 Claims, 4 Drawing Sheets

(51) Int. Cl.
*G10L 17/06* (2013.01)
*G10L 17/04* (2013.01)
*G10L 25/60* (2013.01)
*G10L 17/00* (2013.01)

(56) References Cited

U.S. PATENT DOCUMENTS

| | | | |
|---|---|---|---|
| 9,111,407 B2 | 8/2015 | Broman et al. | |
| 9,237,232 B1* | 1/2016 | Williams | G10L 17/04 |
| 9,300,801 B1* | 3/2016 | Warford | G10L 25/63 |
| 2003/0221125 A1* | 11/2003 | Rolfe | G07C 9/37 705/12 |
| 2004/0190688 A1* | 9/2004 | Timmins | H04M 3/4878 379/88.02 |
| 2006/0188076 A1* | 8/2006 | Isenberg | H04M 3/385 379/88.02 |
| 2006/0262908 A1* | 11/2006 | Chambers | H04M 3/385 379/88.01 |
| 2006/0285665 A1* | 12/2006 | Wasserblat | G06Q 20/4016 379/114.14 |
| 2008/0256613 A1* | 10/2008 | Grover | G10L 15/26 726/5 |
| 2009/0094029 A1* | 4/2009 | Koch | H04M 3/42221 704/246 |
| 2014/0136194 A1* | 5/2014 | Warford | G10L 25/78 704/233 |
| 2014/0142944 A1* | 5/2014 | Ziv | G10L 17/00 704/250 |
| 2014/0348308 A1* | 11/2014 | Krause | H04M 3/51 379/88.02 |
| 2015/0025887 A1* | 1/2015 | Sidi | G10L 17/04 704/245 |
| 2016/0275500 A1* | 9/2016 | Buchholtz | G06Q 20/4012 |
| 2018/0205823 A1* | 7/2018 | Horton | G10L 17/00 |
| 2019/0050545 A1* | 2/2019 | Keret | G10L 17/24 |
| 2020/0211571 A1* | 7/2020 | Shoa | G10L 17/06 |

* cited by examiner

SYSTEMS AND METHODS OF VOICEPRINT GENERATION AND USE IN ENFORCING COMPLIANCE POLICIES

BACKGROUND OF THE INVENTION

Field of the Invention

This disclosure generally relates to systems and methods for creating robust "voiceprints" that uniquely identify any individual using long-form voice samples for the individual, and using the voiceprint to authenticate the individual and/or enforce compliance and data protection policies.

Background

Businesses often employ systems to monitor and record business-related communication sessions. For example, in the customer service context, customer service interactions between a customer and a support agent are commonly recorded and reviewed for quality assurance purposes. However, it may be desirable or necessary (e.g., due to legal requirements or company policy) for the call monitoring system to identify and suppress a particular user's voice in a call recording. For example, corporate policies may preclude recording or playing back the speech of a particular call participant (e.g., a CEO or in-house attorney) or on particular subjects, which may be characterized by certain keywords being spoken. Traditionally, such voice suppression could only be accomplished through post-processing performed manually by authorized administrators. But, these traditional methods are labor intensive, expensive, and frequently error-prone. Moreover, it may be desirable to apply these policies in real-time, but traditional approaches are often times unable to accurately identify call participants, and do not offer the ability to selectively suppress recording of a participants voice, instead only offering the binary ability to record/not record the entire communications session. Laws and/or company policy may also operate to restrict communication between different parties, for example, restricting inter-departmental communications where potential conflicts of interest may exist. Today, such communications are restricted by implementing dialing or routing limitations, but such restrictions are not sufficiently robust or can be easily circumvented (e.g., placing a call from a personal phone).

Call monitoring systems may also be used to provide automated services to systems users. Call monitoring systems, for example, may be employed by stock exchanges or brokerages as part of an automated trading platform, which may allow traders to engage in financial transactions over the phone. In such cases, the call monitoring system may need to limit accessibility to these services to certain authenticated users. Traditional voice authentication techniques are rather limited in that they are commonly derived from a single isolated instance (e.g, "Mary, please say your name so that we may identify you in the future."), which in practice may not properly authenticate a user (e.g., failing to authenticate an otherwise authorized user when in a different acoustic environment). Furthermore, the authentication phrase is often based on common user profile-type information, making it susceptible to circumvention (e.g., via a replay attack).

BRIEF SUMMARY

The presently disclosed communication management system seeks to address the above-mentioned limitations by analyzing previously recorded communication sessions of a user, containing long-form conversational speech in potentially varied acoustic environments, to create a more complete and accurate voice profile (or "voiceprint"). This voiceprint is better able to authenticate a user, and is uniquely suited for use in the real-time identification of call participants and automatic enforcement of compliance and data-protection policies.

BRIEF DESCRIPTION OF THE DRAWINGS

The accompanying drawings, which are incorporated herein and form part of the specification, illustrate one or more aspects of the present invention and, together with the description, further serve to explain the principles of the invention and to enable a person skilled in the relevant art(s) to make and use the invention.

Figure 1:
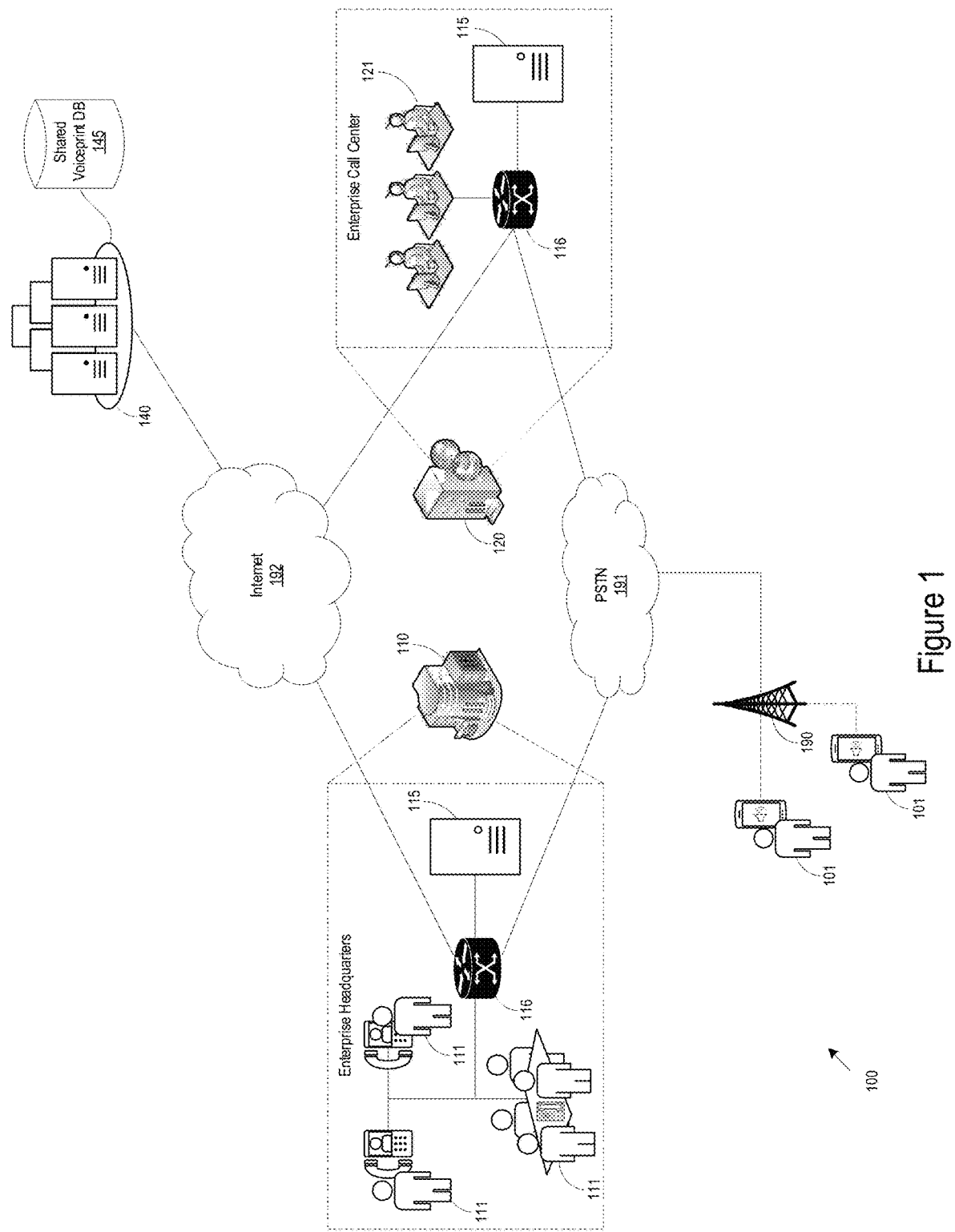
FIG. 1 illustrates an exemplary environment in which one or more call monitoring systems may be used.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. Unless otherwise indicated, the drawings provided throughout the disclosure should not necessarily be interpreted as to-scale drawings.

DETAILED DESCRIPTION

FIG. 1 illustrates an exemplary environment 100 in which the present invention may be deployed to facilitate call monitoring and recording functionality, and/or enforce compliance and data-protection related policies, with respect to communication sessions held between one or more call participants. As illustrated, the environment 100 includes enterprise headquarters 110, having one or more employees 111, enterprise call center 120, having one or more customer support agents 121, and one or more enterprise customers 101. Employees 111, customer support agents 121, and enterprise customers 101 may engage in communication sessions with one another. For example, an enterprise customer 101 may initiate a communications session with a customer support agent 121 (e.g., by calling a customer support number). As another example, employees 111 at enterprise headquarters 110 may place internal calls to one another, or participate in conference calls with external call participants (e.g., enterprise customer 101). Employees 111, enterprise customers 101, and customer support agents 121, may use a number of different terminal devices (e.g., landline telephones, cellular telephones, VoIP telephones, etc.) to conduct such communication sessions, with data traversing one or more different networks over which the terminal devices may communicate. As illustrated, for example, communications between customers 101, employees 111, and agents 121 may take place over cellular network 190, public switched telephone network (PSTN) 191, the Internet 192, or some combination thereof. For ease of illustration, the networks in FIG. 1 are depicted broadly, but it should be appreciated that each of the networks themselves may be composed of different nodes or devices that operate together as the illustrated networks.

The enterprise headquarters 110 may also contain a call monitoring system 115 and a communications management device 116. The communications management device 116 may be positioned at the edge of the enterprise headquarters' network, and may route communications (both internal and external to the headquarters) to and from employees 111, as well as to the call monitoring system 115. The call monitoring system 115 may monitor and record some or all communication sessions of employees 111 and enforce various compliance and data-protection policies of the enterprise. In some embodiments, the call monitoring system 115 may be deployed on premises at the enterprise headquarters 110 (as illustrated), while in others, the call monitoring system 115 may be remotely located (e.g., at a cloud data center), in which case the communication data may be routed across one or more different networks (e.g., the Internet 180).

Similarly, the enterprise call center 120 may also contain a call monitoring system 115 and a communications management device 116. The communications management device 116 may be positioned at the edge of the enterprise call center's network, and may route communications (both internal and external to the call center) to and from customer support agents 121, as well as to the call monitoring system 115. The call monitoring system 115 may monitor and record some or all communication sessions of customer support agents 121 and enforce various compliance and data-protection policies of the enterprise. In some embodiments, the call monitoring system 115 may be deployed on premises at the call center 120 (as illustrated), while in others, the call monitoring system 115 may be remotely located (e.g., at a cloud data center), in which case the communication data may be routed across one or more different networks (e.g., the Internet 180).

The environment 100 may also include one or more cloud servers 140, with which the call monitoring systems 115 may interface, for example, offloading compute and/or storage tasks. Cloud servers 140, for example, may host a shared voiceprint database 145 which call monitoring systems 115 may interface with through an outward facing service (e.g., a SOAP or REST web service). Call monitoring systems 115 may periodically synchronize their local voiceprint databases 245 with the shared voiceprint database 145. In some embodiments, cloud servers 140 may also host the recorded communications database 250, while in others cloud servers 140 may perform some of the functionality described below with respect to the call monitoring system 115 (e.g., calculating an audio quality score, providing audio transcription services, etc.). For ease of illustration, the cloud servers 140 in FIG. 1 are depicted broadly, but it should be appreciated that each cloud server 140 itself may be composed of different elements. The cloud servers 140, for example and without limitation, may include one or more input/output interfaces, a display, communication interfaces (e.g., WiFi communication interface, and LAN communication interface), memory, processors, and the like.

Figure 2:
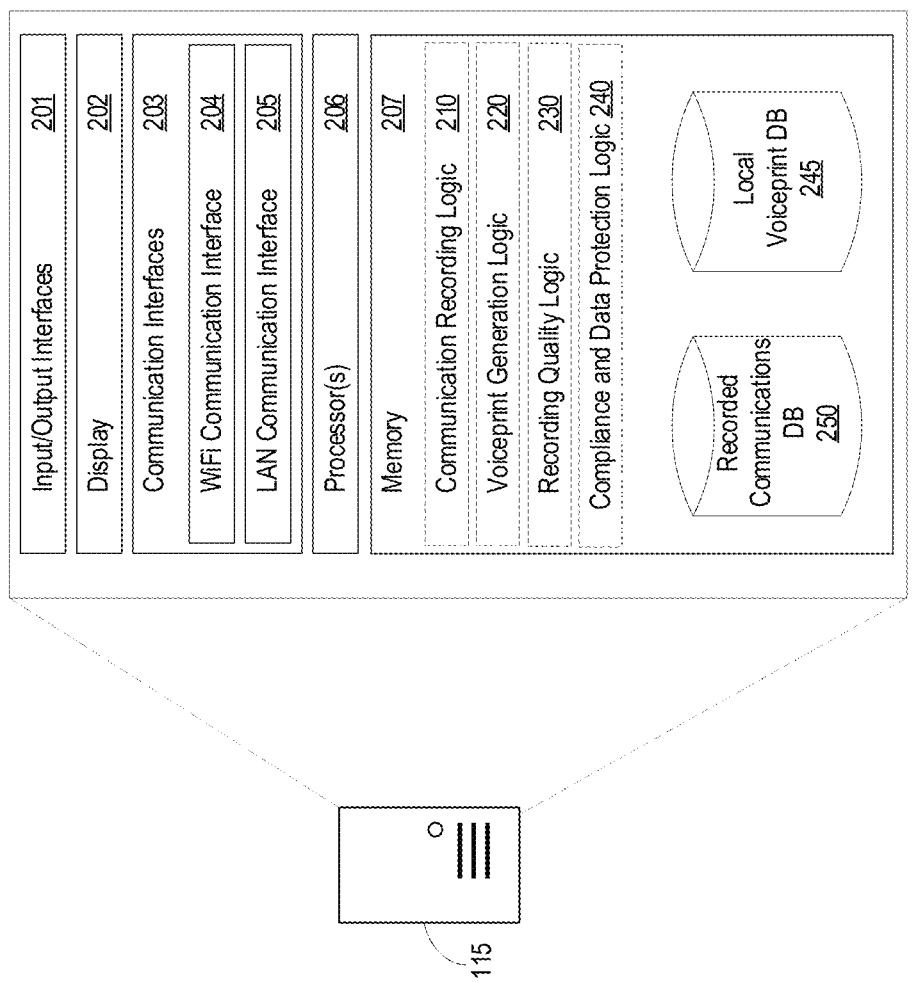
FIG. 2 illustrates an embodiment of a call monitoring system and its constituent components.

FIG. 2 provides a more detailed illustration of an embodiment of the call monitoring system 115 and its constituent components. As illustrated, the call monitoring system 115 may include one or more input/output interfaces 201, a display 202, communication interfaces 203 (e.g., WiFi communication interface 204, and LAN communication interface 205), processors 206, and memory 207. The memory 207 may include communication recording logic 210, voiceprint generation logic 220, recording quality logic 230, and compliance and data protection logic 240, which the processor(s) 206 may utilize to provide the system functionality described below. The memory 207 may also include recorded communications database 250 and local voiceprint database 245.

The communication recording logic 210 may allow the call monitoring system 115 to capture communication sessions as well as manage communication sessions that were previously captured. More particularly, call monitoring system 115 may receive one or more audio data streams from communications management device 116 corresponding to communications sessions being conducted between different participants (e.g., support calls conducted between a customer 101 and agent 121, or conference calls between employees 111). The call monitoring system 115 may automatically, or upon user direction, capture the audio data streams as an audio file, which may be written to the memory 207 of the call monitoring system 115 (e.g., in recorded communications database 250). The audio file that is written to the memory 207 may be formatted to contain a single audio stream for all call participants, or may be a container format storing separate audio streams for each call participant. The call monitoring system 115 may also store metadata associated with the communication sessions, including for example, the location from which the audio data streams originated, the device (and device settings) used to create the audio data streams, and details regarding the network connection over which it was received.

The call monitoring system 115 may also utilize recording quality logic 230 to assess the quality of a communications session. The call monitoring system 115, for example, may process audio files, whether previously recorded or being actively recorded, and calculate an audio quality score (AQS) for the one or more audio data streams contained therein. In assessing the quality of the audio data streams, the call monitoring system 115 may utilize the techniques disclosed in co-pending, commonly owned, U.S. patent application Ser. No. 16/593,461, entitled "SYSTEMS AND METHODS FOR RECORDING QUALITY DRIVEN COMMUNICATION MANAGEMENT," which is incorporated by reference herein in its entirety. The call monitoring system 115 may use the AQS to determine whether the audio stream is of sufficient quality to be processed further in generating a participant voiceprint.

The call monitoring system 115 may utilize voiceprint generation logic 220 to generate voiceprints based on recordings of previously captured or ongoing user communication sessions. As noted above, the audio file of the communications session frequently may contain audio streams having multiple distinct call participants, and the voiceprint generation logic 220 may invoke a speaker separation process to "individualize" each participant. For example, the call monitoring system 115 may segment the audio stream into one or more utterances, which may be analyzed to determine associated acoustical factors (e.g., pitch, tone, frequency profile, ambient noise, etc.). The call monitoring system 115 may then select or otherwise group utterances having similar acoustical factors as being attributed to a single speaker (e.g., using k-means or other clustering techniques). The utterances for each speaker may then be analyzed to identify unique characteristics of the particular participant's speech (e.g., formants, harmonics, periodicity, etc.), which may constitute the speaker's voiceprint. As noted before, the recordings may be conversational in nature and relatively longer in duration, and thus may generate a more complete and accurate voiceprint for the speaker in contrast to traditional techniques that utilize voice samples containing only a single word, phrase, or sentence.

The call monitoring system 115 may compare the voiceprint, and in some embodiments the acoustical factors, with those previously identified, for example, by querying local voiceprint database 245 or shared voiceprint database 145 for possible matches. If an existing voiceprint match is found, the call monitoring system 115 may modify the speaker ID attribute of the generated voiceprint to that of the preexisting voiceprint with which the voiceprint matched. By combining voiceprints derived from different recordings of the same individual, which may have varied voiceprints due to acoustical differences from one recording to the another, a more robust voiceprint may be created that is able to more consistently and accurately identify a call participant.

Alternatively, if no match is found, the call monitoring system 115 may store the acoustical factors and voiceprint (e.g., in local voiceprint database 245) in association with a generic speaker ID ascribed by the call monitoring system 115 (e.g., "Speaker1"). The call monitoring system 115 may then attempt to identify the actual identity of the speaker. For example, the voiceprint may be flagged for review by a supervisor or administrator, who may manually enter the speaker ID (e.g., modifying "Speaker1" to "John Smith CEO"). In some embodiments, the call monitoring system 115 may leverage metadata associated with the recording to automate or otherwise assist in the identification. For example, the metadata for the recording may indicate the telephone number of the speaker, which the system administrator may use to confirm the identity of the voiceprint.

Similarly, in some instances, the speaker may have provided additional biometric information (e.g., a fingerprint, retinal scan, facial recognition, etc.) in order to participate in the communications session. For example, in the financial services industry, trading turrets frequently employ private wire communications, which must remain secure, with individual traders only being granted access to the line upon verification of certain biometric information. The system or system administrator may use this biometric information to confirm the identity of the voiceprint and update the speaker ID.

The call monitoring system 115 may store the voiceprints and associated acoustical factors locally, in memory 207, and/or push the voiceprints to a shared database 145 on a cloud server 140 (e.g., in a cloud data center). In some embodiments, the voiceprint and acoustical factors may not be pushed to the shared database until a positive identification has been made. By placing the voiceprints in a shared database, call recordings for an individual can effectively be aggregated across independent call monitoring systems, which may result in more robust voiceprints and, consequently, more consistent and accurate speaker identification. Utilizing a shared database may allow other applications or services to leverage the voiceprints generated by a call recording service. The call monitoring system 115 may provide a mechanism by which an individual may elect to self-associate their voiceprint for use with these other applications or services.

The call monitoring system 115 may utilize compliance and data protection logic 240 to enforce compliance and data-protection related policies, which may applied to previously recorded communications sessions or applied in real-time to communication sessions being monitored by the call monitoring system 115. With respect to real-time communication sessions, the call monitoring system 115 may enforce the policies automatically, may prompt a system administrator to take action, or may provide the call participants with the ability to initiate enforcement.

The call monitoring system 115, for example, may delete, suppress, or otherwise obscure the recordings based on policies in place for an individual associated with a voiceprint identified in the call. For instance, it may be company policy that communications sessions involving an employee 101 (e.g., the company CEO) are to be archived indefinitely and never distributed. As another example, the compliance and data protection logic 240 may obscure a participant's voice, or utterance of particular keywords, upon playback or export of the recording (i.e., recording the participant's voice for record keeping purposes but suppressing the participant's voice for privacy or security reasons).

The compliance and data protection logic 240 may similarly function to suppress the recording in the first instance. For example, upon identification of a participant's voice (e.g., in-house legal counsel), or the utterance of particular keywords (e.g., PINs, passwords, or other sensitive account information), the call monitoring system 115 may stop recording and/or erase a portion of the recording. Again, the call monitoring system 115 may stop recording automatically, prompt a system administrator in order to do so, or provide call participants with the ability to invoke the functionality.

In some embodiments, the call monitoring system 115 may also employ compliance and data protection logic 240 to analyze a transcription of a particular communications session to determine if any policies have been breached. By way of example, the call monitoring system 115 may be able to detect when an otherwise authorized user (e.g., a stock trader permitted to use the automated trading platform) attempts to take an unauthorized action (e.g., trading a security on a restricted list), and may flag or otherwise report this activity to an agent for further review.

In other embodiments, the compliance and data protection logic 240 may allow the call monitoring system 115 to prevent a call from taking place or continuing (e.g., preventing employees from communicating with one another where conflicts of interest may exist), detect an unauthorized access attempt and alert a response agent (e.g., when a person attempts to impersonate another person in order to access the system), or provide continuous monitoring of a call participant to prevent fraud with respect to automated services provided by the system (e.g., to prevent the unauthorized execution of a financial trade or other service action).

Figure 3:
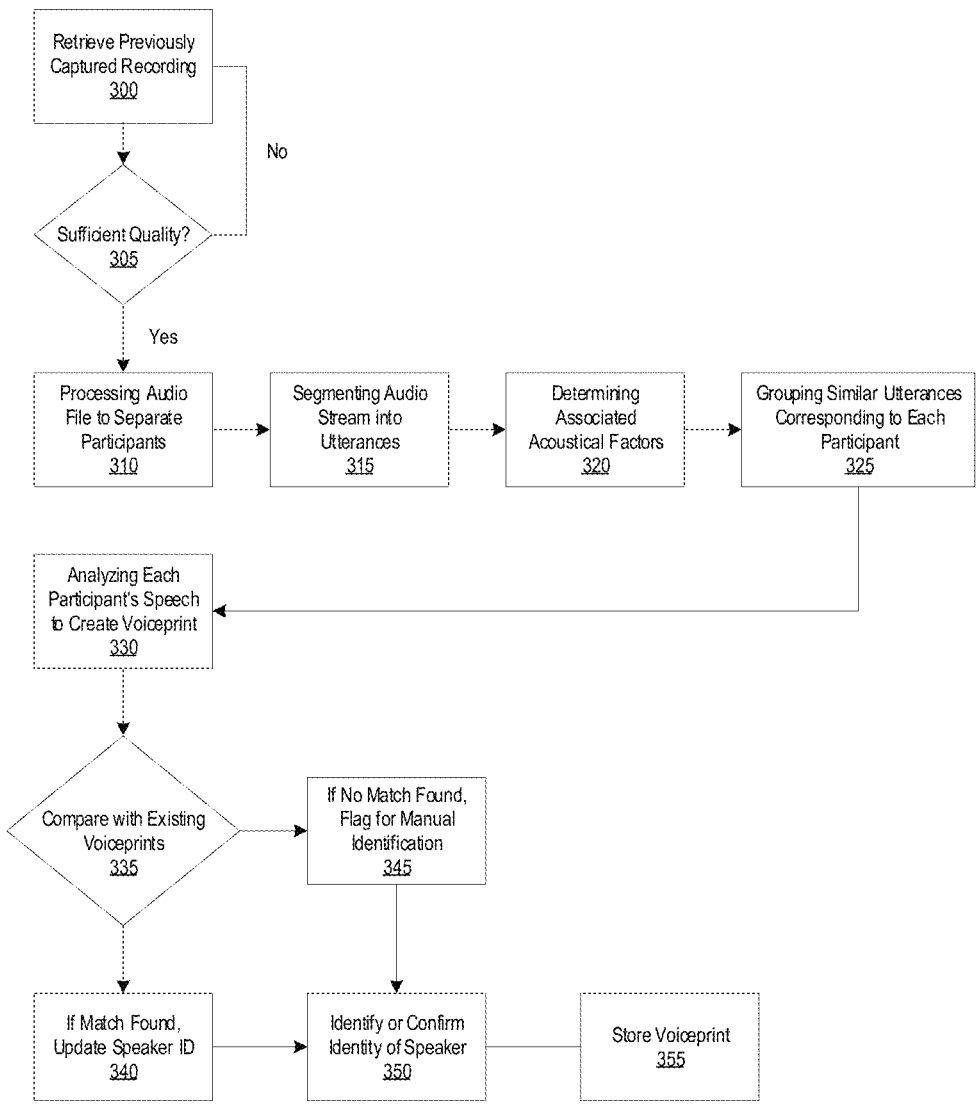
FIG. 3 depicts a high-level logic flow that may be employed in an embodiment of the call monitoring system to create a voiceprint database.

FIG. 3 depicts a high-level logic flow that may be employed in an embodiment of the call monitoring system to create a voiceprint database. The call monitoring system 115 may begin by retrieving one or more previously captured recordings, for example, from recorded communications database 250 (300). The call monitoring system 115 may then analyze the audio file to determine if it is of sufficient quality to undergo further processing (305). If the audio file is determined to be of sufficient quality, the call monitoring system 115 may proceed with processing the audio file to generate a voiceprint. If not, the process may start over with another recording.

In order to generate a voiceprint based on the audio file, the call monitoring system 115 may perform a speaker separation process to "individualize" the speech for each call participants (310). This may involve segmenting the audio file into one or more utterances (315), which may then be analyzed to determine certain associated acoustical factors (e.g., frequency profile, ambient noise, etc.) (320). Based on the acoustical factors, the call monitoring system 115 may group utterances having similar acoustical factors as corresponding to a particular participant, thereby individualizing the audio file (325). The utterances for each participant may then be analyzed to identify unique speech characteristics (e.g., formants, harmonics, periodicity, etc.), forming the voiceprint for respective participants (330).

Each of the voiceprints generated may then be compared to existing voiceprints, for example, by querying local voiceprint database 245 or shared voiceprint database 145 for possible matches (335). If a match for a particular voiceprint is found, the call monitoring system 115 may modify the speaker ID attribute of the generated voiceprint to that of the preexisting voiceprint with which the voiceprint matched, and update or refine the preexisting voiceprint (340). But if no match is found, the call monitoring system 115 may store the voiceprint and associated acoustical factors in association with a generic speaker ID, for example, in local voiceprint database 260 (345). A system administrator may then review the associated recording to identify (or confirm) an identity of the speaker to whom the voiceprint corresponds, and may leverage metadata associated with the recording, including for example, biometric information of a call participant, in order to do so (350). Once the speaker has been accurately identified, the voiceprint, acoustical factors, and modified speaker ID may be stored, for example, in local voiceprint database 245 or shared voiceprint database 145 (355). The process may then be repeated for additional call recordings.

Figure 4:
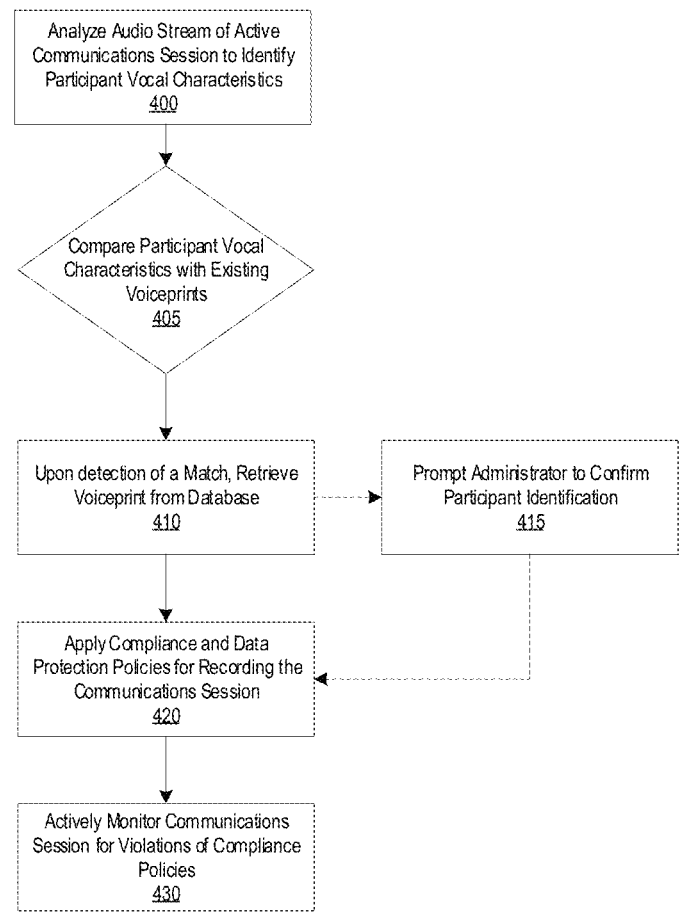
FIG. 4 depicts a high-level logic flow that may be employed in an embodiment of the call monitoring system to apply and/or enforce compliance or data protection policies.

FIG. 4 depicts a high-level logic flow that may be employed in an embodiment of the call monitoring system 115 to apply and/or enforce compliance or data protection policies. Once a communications session is initiated, the call monitoring system 115 may analyze the audio stream(s) as they are received in order to identify unique characteristics in the speech contained in the audio stream (400). The call monitoring system 115 may compare these characteristics to existing voiceprints, for example, by querying local voiceprint database 245 or shared voiceprint database 145 (405). If a high probability match exists, the voiceprint may be retrieved by the call monitoring system 115 (410). The call monitoring system 115 may optionally notify a system administrator of the match and retrieval, and prompt the administrator to confirm that the voiceprint does correspond to the call participant (415).

Upon identification of a call participant, the call monitoring system 115 may apply one or more compliance or data protection policies in recording the communications session (420). For example, if a policy indicates that the identified participant is never to be recorded, the call monitoring system 115 may initiate call suppression measures. The call monitoring system 115 may do so automatically or it may provide the participant with the option of invoking this functionality. As another example, the call monitoring system 115 may suppress certain keywords, which the system administrators, or even call participants, may be able to enter through a provided interface (e.g., through a web interface).

The call monitoring system 115 may also actively monitor communications sessions to ensure that compliance policies are not violated, flagging potential violations for further review or taking action (disconnecting a call participant, notifying a system administrator, notifying law enforcement, etc.) (430). The call monitoring system 115, for example, upon identification of the call participants, may look to see whether the participants are authorized to speak with each other. If such communications are not authorized (e.g., where a conflict of interest may exist), the call monitoring system 115 may terminate the call.

The call monitoring system 115 may also detect when an identified call participant attempts to perform an authorized task or breach an enterprise compliance policy, or detect that a call participant is not who they claim to be (e.g., where the identified voiceprint is associated with someone different than the call participant). The call monitoring system 115 may also determine a breach condition where the number of policy breaches, unauthorized access attempts, identified speakers, errors detected, and/or other "escapes" (i.e., voiceprint related issues) exceeds a predetermined value. The call monitoring system may automatically take action, or may flag such events for further review, for example, by a system or security administrator.

While specific embodiments of the invention have been described above, it will be appreciated that the invention may be practiced other than as described. The embodiment(s) described, and references in the specification to "one embodiment," "an embodiment," "an example embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

The description provided above is intended to be illustrative and non-limiting. Thus, it will be apparent to one skilled in the art that modifications may be made to the present invention as described without departing from the scope of the claims set out below. For instance, while the above description was provided within the context of a call center's operation, the invention is not thus limited, and may be naturally extended to other contexts. The call monitoring system, for example, may be used to identify and address audio quality issues experienced during normal voice calls or conference calls, or used alongside voicemail and other call recording systems.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed:

1. A method comprising:
   receiving audio data of an active communications session comprising speech from two or more participants;

analyzing the audio data to determine a quality of the audio data;
based on a determination that the audio data is of sufficient quality, separating the audio data into speech for each of the two or more participants;
analyzing the speech for each of the two or more participants to generate a voiceprint for each participant;
identifying a particular participant in the active communications session based on the generated voiceprints; and
applying one or more compliance policies when recording the audio data of the active communications sessions comprising:
determining whether the particular participant is authorized to participate in the active communications session; and
terminating the active communications session based on the determination that the active communications session is not authorized.

2. The method of claim 1, wherein separating the audio data further comprises:
segmenting the audio data into a plurality of utterances;
analyzing the utterances to calculate one or more associated acoustical factors for each utterance; and
selecting utterances having similar acoustical factors as the speech for each of the two or more participants.

3. The method of claim 1, further comprising:
querying a database comprising a plurality of existing voiceprints to determine if a match exists for each voiceprint generated for the two or more participants; and
based on a determination that a matching voiceprint exists in the plurality of existing voiceprints, updating the matching voiceprint in the database using the corresponding voiceprint generated for each of the two or more participants.

4. The method of claim 1, further comprising:
identifying the particular participant in a historical recording based on the voiceprints generated for each of the two or more participants; and
applying one or more compliance policies to the historical recording.

5. The method of claim 4, wherein applying one or more compliance policies to the historical recording comprises:
generating a transcript of the historical recording; and
analyzing the transcript to determine whether any unauthorized actions were taken by the particular participant; and
flagging the historical recording for review by a compliance review agent.

6. The method of claim 1, wherein applying the one or more compliance policies comprises suppressing the speech of the particular participant when recording the audio data of the active communications session.

7. A call monitoring system comprising:
a non-transitory storage medium having a plurality of instructions stored thereon; and
at least one processor configure to execute the instructions to:
receive audio data of an active communications session comprising speech from two or more participants;
analyze the audio data to determine a quality of the audio data;
based on a determination that the audio data is of sufficient quality, separate the audio data into speech for each of the two or more participants;
analyze the speech for each of the two or more participants to generate a voiceprint for each participant;
identify a particular participant in the active communications session based on the generated voiceprints; and
apply one or more compliance policies when recording the audio data of the active communications, wherein the processor is configured to execute the instructions to:
determine whether the particular participant is authorized to participate in the active communications session; and
terminate the active communications session based on the determination that the active communications session is not authorized.

8. The call monitoring system of claim 7, wherein in separating the audio data further, the processor is configured to execute the instructions to:
segment the audio data into a plurality of utterances;
analyze the utterances to calculate one or more associated acoustical factors for each utterance; and
select utterances having similar acoustical factors as the speech for each of the two or more participants.

9. The call monitoring system of claim 7, wherein the processor is configured to execute the instructions to:
query a database comprising a plurality of existing voiceprints to determine if a match exists for each voiceprint generated for the two or more participants; and
based on a determination that a matching voiceprint exists in the plurality of existing voiceprints, update the matching voiceprint in the database using the corresponding voiceprint generated for each of the two or more participants.

10. The call monitoring system of claim 7, wherein the processor is configured to execute the instructions to:
identify the particular participant in a historical recording based on the voiceprints generated for each of the two or more participants; and
apply one or more compliance policies to the historical recording.

11. The call monitoring system of claim 10, wherein in applying the one or more compliance policies, the processor is configured to execute the instructions to:
generate a transcript of the historical recording; and
analyze the transcript to determine whether any unauthorized actions were taken by the particular participant; and
flag the historical recording for review by a compliance review agent.

12. The call monitoring system of claim 7, wherein the processor is configured to execute the instructions to suppress the speech of the particular participant when recording the audio data of the active communications session.

13. A non-transitory computer-readable medium comprising a plurality of instructions, the instructions being executable by a processor to:
receive audio data of an active communications session comprising speech from two or more participants;
analyze the audio data to determine a quality of the audio data;
based on a determination that the audio data is of sufficient quality, separate the audio data into speech for each of the two or more participants;
analyze the speech for each of the two or more participants to generate a voiceprint for each participant;
identify a particular participant in the active communications session based on the generated voiceprints;

apply one or more compliance policies when recording the audio data of the active communications, wherein the instructions are executable by the processor to:
   determine whether the particular participant is authorized to participate in the active communications session; and
   terminate the active communications session based on the determination that the active communications session is not authorized.

14. The non-transitory computer-readable medium of claim 13, wherein the instructions are further executable by the processor to:
   segment the audio data into a plurality of utterances;
   analyze the utterances to calculate one or more associated acoustical factors for each utterance; and
   select utterances having similar acoustical factors as the speech for each of the two or more participants.

15. The non-transitory computer-readable medium of claim 13, wherein the instructions are further executable by the processor to:
   query a database comprising a plurality of existing voiceprints to determine if a match exists for each voiceprint generated for the two or more participants; and
   based on a determination that a matching voiceprint exists in the plurality of existing voiceprints, updating the matching voiceprint in the database using the corresponding voiceprint generated for each of the two or more participants.

16. The non-transitory computer-readable medium of claim 13, wherein the instructions are further executable by the processor to:
   identify the particular participant in a historical recording based on the voiceprints generated for each of the two or more participants; and
   apply one or more compliance policies to the historical recording.

17. The non-transitory computer-readable medium of claim 16, wherein the instructions are further executable by the processor to:
   generate a transcript of the historical recording; and
   analyze the transcript to determine whether any unauthorized actions were taken by the particular participant; and
   flag the historical recording for review by a compliance review agent.

18. The non-transitory computer-readable medium of claim 13, wherein the instructions are further executable by the processor to suppress the speech of the particular participant when recording the audio data of the active communications session.

* * * * *